(12) United States Patent
Sahashi

(10) Patent No.: US 8,723,821 B2
(45) Date of Patent: May 13, 2014

(54) ELECTRONIC APPARATUS AND INPUT CONTROL METHOD

(75) Inventor: Masaya Sahashi, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 282 days.

(21) Appl. No.: 13/149,564

(22) Filed: May 31, 2011

(65) Prior Publication Data

US 2011/0291979 A1 Dec. 1, 2011

(30) Foreign Application Priority Data

May 31, 2010 (JP) .................................. 2010-125139

(51) Int. Cl.
*G06F 3/041* (2006.01)

(52) U.S. Cl.
USPC .......................................................... 345/173

(58) Field of Classification Search
USPC .......................................................... 345/173
See application file for complete search history.

(56) References Cited

U.S. PATENT DOCUMENTS

| | | | |
|---|---|---|---|
| 7,096,432 B2 | 8/2006 | Huapaya et al. | |
| 7,167,165 B2 | 1/2007 | Keely et al. | |
| 7,433,179 B2 | 10/2008 | Hisano et al. | |
| 7,825,922 B2 | 11/2010 | Keely et al. | |
| 7,831,922 B2 | 11/2010 | Huapaya et al. | |
| 2008/0001925 A1* | 1/2008 | XiaoPing | 345/173 |
| 2008/0106519 A1* | 5/2008 | Murray | 345/169 |
| 2010/0099463 A1* | 4/2010 | Kim et al. | 455/566 |
| 2010/0109999 A1* | 5/2010 | Qui | 345/156 |
| 2011/0007009 A1 | 1/2011 | Ishihara et al. | |
| 2013/0122964 A1* | 5/2013 | Strom | 455/566 |

FOREIGN PATENT DOCUMENTS

| | | |
|---|---|---|
| JP | 2003-345507 | 12/2003 |
| JP | 2005-031786 | 2/2005 |
| JP | 2006-053678 | 2/2006 |
| JP | 2009-163356 | 7/2009 |
| JP | 2010-086064 | 4/2010 |
| WO | WO 2009-017125 A1 | 2/2009 |

OTHER PUBLICATIONS

Office Action, Notice of Reasons for Rejection mailed Nov. 29, 2011 in 7 pages.
Office Action, Notice of Reasons for Rejection mailed Mar. 19, 2013 in 7 pages.

* cited by examiner

*Primary Examiner* — Lixi C Simpson
(74) *Attorney, Agent, or Firm* — Knobbe, Martens Olson & Bear, LLP

(57) ABSTRACT

According to one embodiment, an electronic apparatus includes a touch screen display, a first region setup module, a second region setup module, an operation detection module, a first data output module and a second data output module. The first region setup module sets a first region including plural input regions on the touch screen display. The second region setup module sets a second region overlapped with the first region. The operation detection module detects whether a touch operation is a first operation or a second operation. The first data output module outputs first data corresponding to a first potion of the first region where the touch operation is performed, when the first operation is detected. The second data output module outputs second data corresponding to a second position where the touch operation is performed, when the second operation is detected.

3 Claims, 11 Drawing Sheets

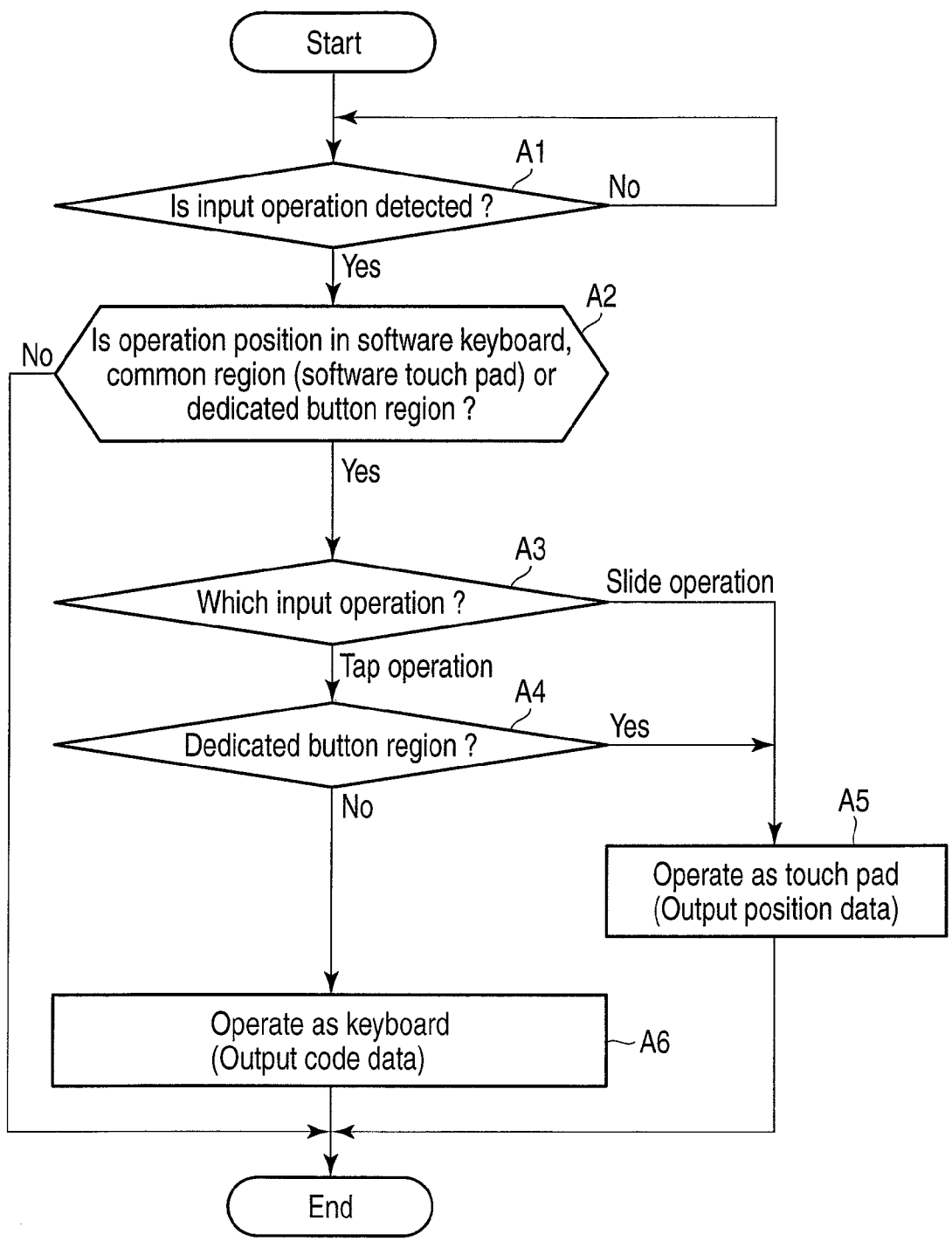
F I G. 5

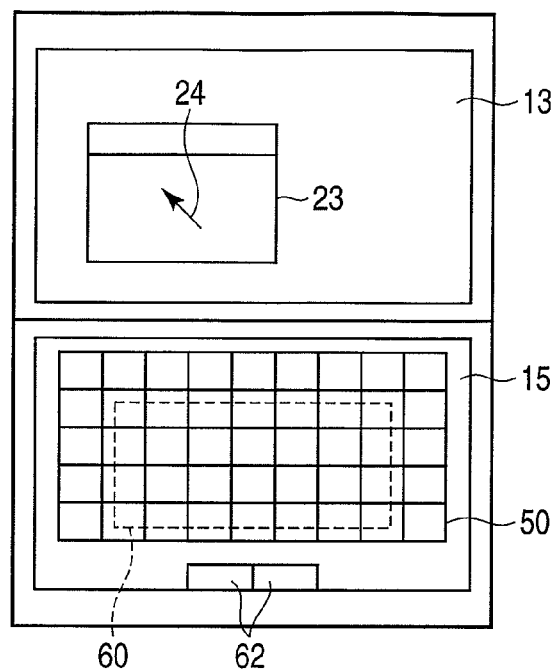
F I G. 6
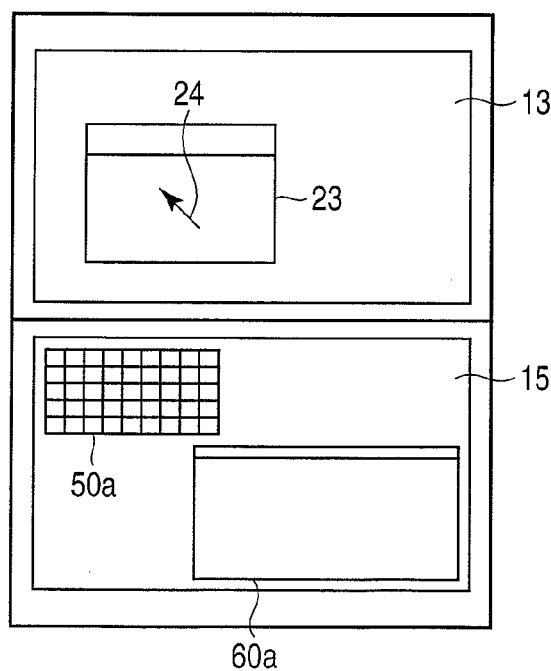
F I G. 7

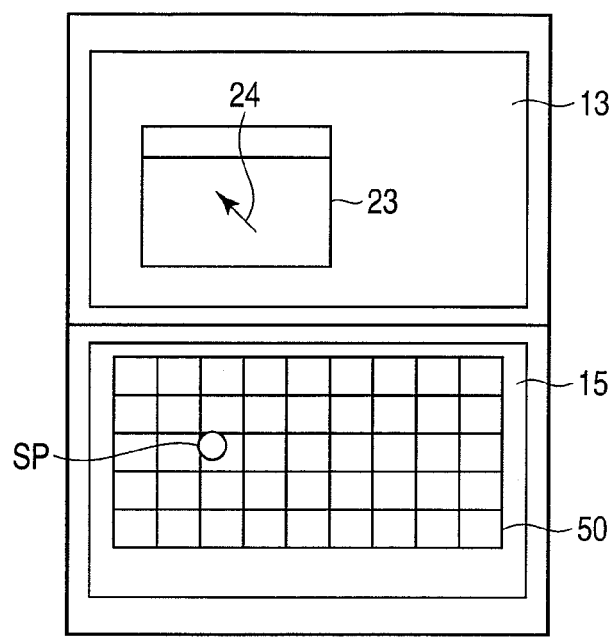
F I G. 1 0
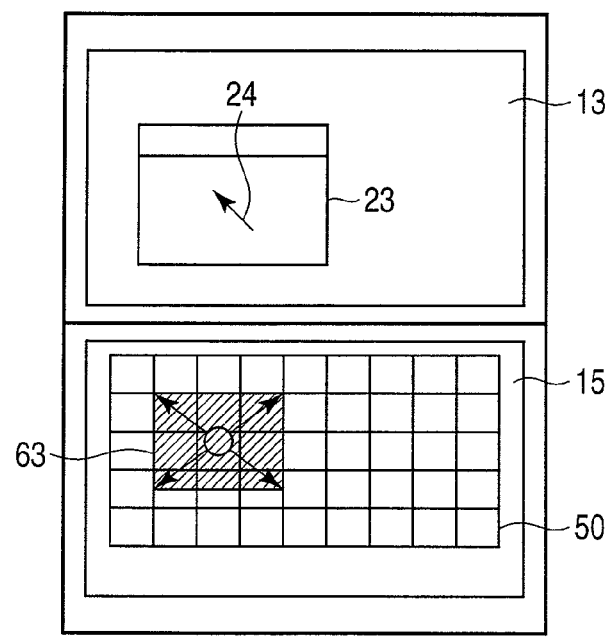
F I G. 1 1

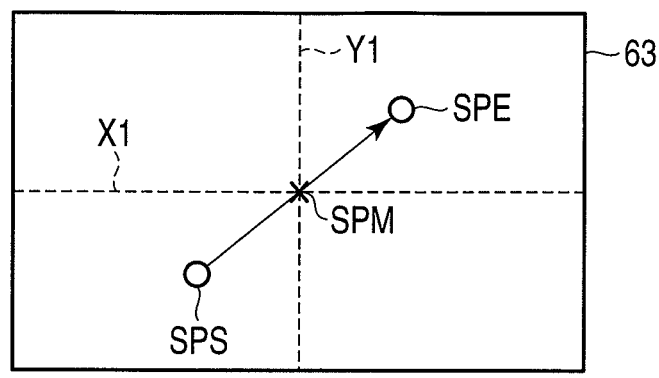
F I G. 1 2
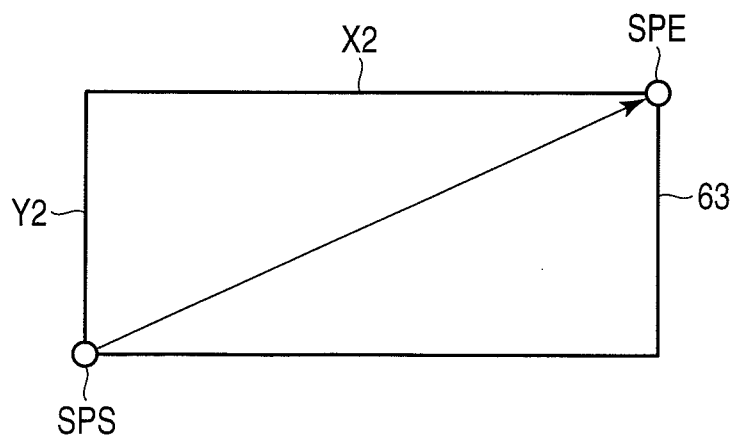
F I G. 1 3

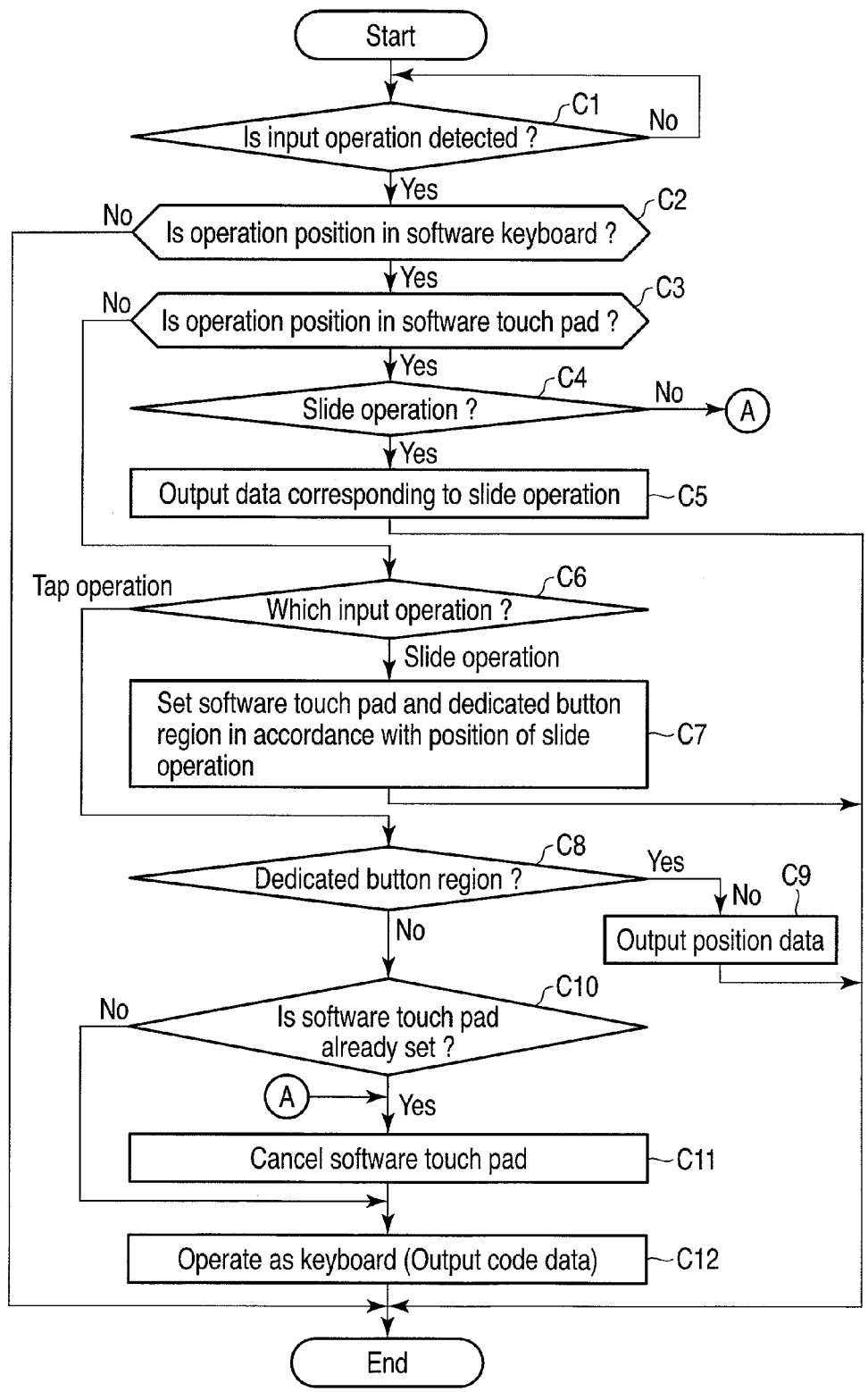
F I G. 14

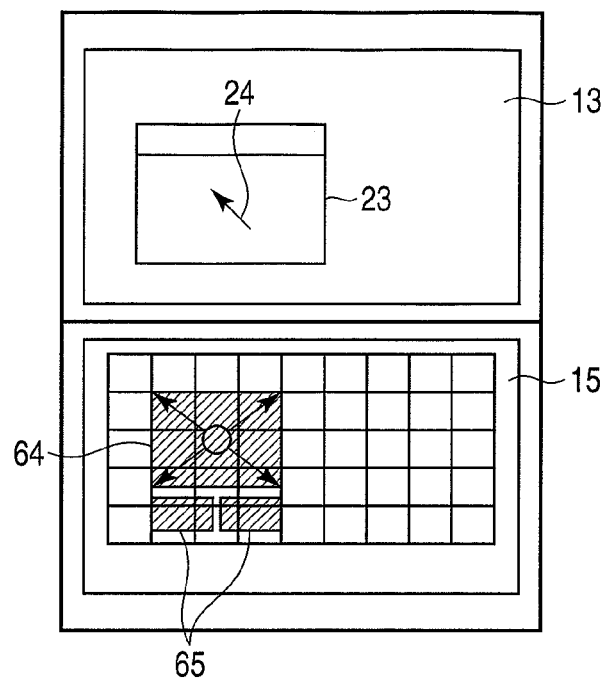
F I G. 15
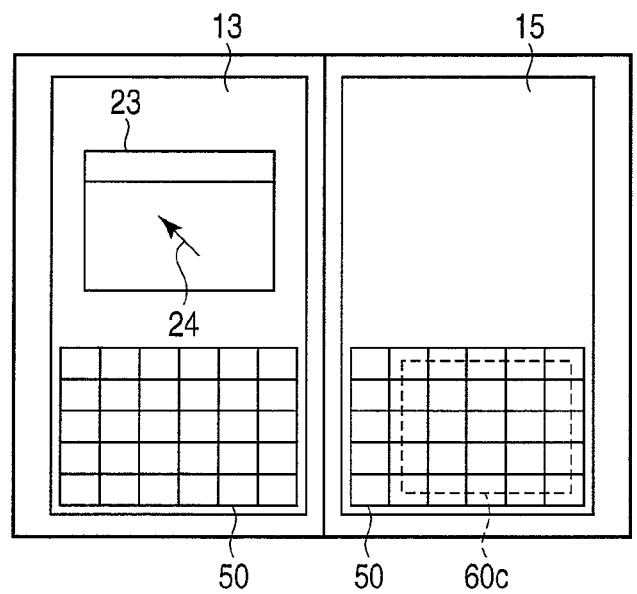
F I G. 16

ELECTRONIC APPARATUS AND INPUT CONTROL METHOD

CROSS-REFERENCE TO RELATED APPLICATIONS

This application is based upon and claims the benefit of priority from Japanese Patent Application No. 2010-125139, filed May 31, 2010; the entire contents of which are incorporated herein by reference.

FIELD

Embodiments described herein relate generally to an electronic apparatus including a touch screen display, and an input control method.

BACKGROUND

Conventionally, there is known a touch screen display as an input device of a portable electronic apparatus such as a personal computer. The electronic apparatus including the touch screen display can display a virtual keyboard (software keyboard), and can input data with use of the software keyboard, like an ordinary keyboard.

In addition, the electronic apparatus can use the touch screen display as a pointing device. For example, the electronic apparatus displays a virtual mouse, in addition to the software keyboard, and inputs pointing data by the movement of the virtual mouse by a touch.

In the electronic apparatus including the conventional touch screen display, it is possible to execute data input from the software keyboard and data input from the pointing device.

However, when the data input from the software keyboard and the data input from the pointing device are executed in a mixed manner, it is necessary to selectively use either the software keyboard or the virtual mouse which is defined in a region different from the software keyboard. Thus, the input operation is time-consuming, and there has been a demand for an improvement of the operability of the data input from the software keyboard and the data input from the virtual pointing device such as a virtual mouse.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 5 is an exemplary flow chart illustrating the operation of a first embodiment;

FIG. 6 is an exemplary view showing examples of display screens of touch screen displays in the first embodiment;

FIG. 7 is an exemplary view showing examples of the display screens of the touch screen displays in the first embodiment;

FIG. 10 is an exemplary view showing examples of display screens of touch screen displays in the second embodiment;

FIG. 11 is an exemplary view showing examples of the display screens of the touch screen displays in the second embodiment;

FIG. 12 is an exemplary view illustrating a setup operation of a software touch pad in the second embodiment;

FIG. 13 is an exemplary view illustrating the setup operation of the software touch pad in the second embodiment;

FIG. 14 is an exemplary flow chart illustrating the operation of a third embodiment;

FIG. 15 is an exemplary view illustrating a setup operation of a software touch pad in the third embodiment; and FIG. 16 is an exemplary view showing examples of display screens of touch screen displays in the embodiment.

DETAILED DESCRIPTION

Various embodiments will be described hereinafter with reference to the accompanying drawings.

In general, according to one embodiment, an electronic apparatus comprises touch screen display, a first region setup module, a second region setup module, an operation detection module, a first data output module, and a second data output module. The first region setup module is configured to set a first region comprising a plurality of input regions on the touch screen display. The second region setup module is configured to set a second region which is overlapped with the first region. The operation detection module is configured to detect whether a touch operation on an overlapped region between the first region and the second region is a first operation in which a time period between a touch and a release of the touch is shorter than a preset time, or a second operation in which the time period between the touch and the release of the touch is the preset time or more. The first data output module is configured to output first data corresponding to a first potion of the first region where the touch operation is performed, when the first operation is detected. The second data output module is configured to output second data corresponding to a second position where the touch operation is performed, when the second operation is detected.

Figure 1:
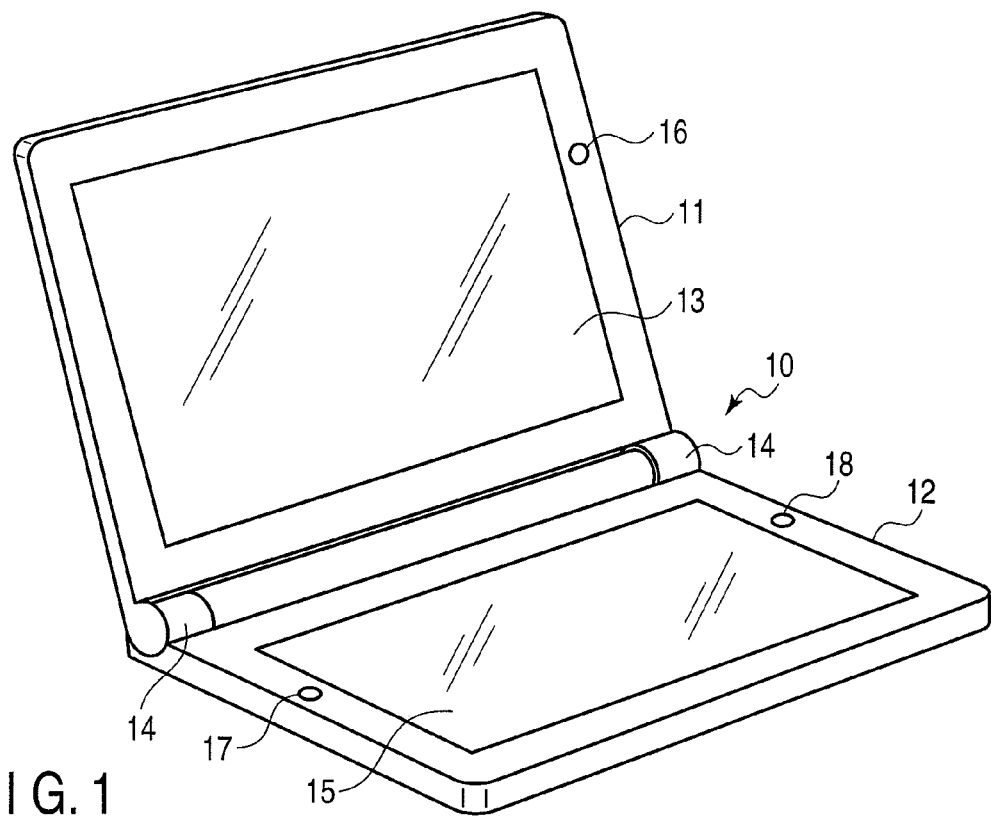
FIG. 1 is an exemplary view showing the external appearance of an electronic apparatus according to an embodiment.

FIG. 1 is an exemplary view showing the external appearance of an electronic apparatus according to embodiments (first embodiment, second embodiment and third embodiment). This electronic apparatus is realized, for example, as a battery-powerable portable personal computer 10.

FIG. 1 is a perspective view showing the personal computer 10 in a state in which a first unit 11 of the personal computer 10 is opened. The personal computer 10 comprises the first unit 11 and a second unit 12. A touch screen display 13 is built in an upper surface of the first unit 11. The touch screen display 13 is composed of a touch panel 13A and a liquid crystal display (LCD) 13B, and a display screen of the touch screen display 13 is disposed at a substantially central part of the first unit 11.

The touch screen display 13 is configured, for example, such that the touch panel 13A is attached to the surface of the LCD 13B, and the touch screen display 13 can realize display by the LCD 13B and the detection of a touch position which is touched by a pen or a finger. The user can select various objects, which are displayed on the LCD 13B, by using a pen or a fingertip. The objects, which are to be touched by the user, include, for instance, a window for displaying various information, a software keyboard (virtual keyboard), a software touch pad (virtual pointing device), icons representing folders and files, menus and buttons. The coordinate data representing the touch position on the display screen is input from the touch panel 13A to the CPU in the computer 10.

The first unit 11 has a thin box-shaped housing. The first unit 11 is rotatably attached to the second unit 12 via a hinge module 14. The hinge module 14 is a coupling module for coupling the first unit 11 to the second unit 12. Specifically, a lower end portion of the first unit 11 is supported on a rear end portion of the second unit 12 by the hinge module 14. The first unit 11 is attached to the second unit 12 such that the first unit 11 is rotatable, relative to the second unit 12, between an open position where the top surface of the second unit 12 is exposed and a closed position where the top surface of the second unit 12 is covered by the first unit 11. A power button 16 for powering on or off the personal computer 10 is provided at a predetermined position of the first unit 11, for example, on the right side of the touch screen display 13.

The second unit 12 is a base unit having a thin box-shaped housing. A touch screen display 15 is built in an upper surface of the second unit 12. The touch screen display 15 is composed of a touch panel 15A and a liquid crystal display (LCD) 15B, and a display screen of the touch screen display 15 is disposed at a substantially central part of the second unit 12.

Two button switches 17 and 18 are provided at predetermined positions on the upper surface of the second unit 12, for example, on both sides of the touch screen display 15. Arbitrary functions can be assigned to the button switches 17 and 18. For example, the button switch 17 is used in order to instruct the start of a software keyboard and a software touch pad. For example, the start of the software keyboard can be instructed by a single touch on the button switch 17, and the start of the software touch pad can be instructed by a double touch on the button switch 17.

The touch screen display 15 is configured, for example, such that the touch panel 15A is attached to the surface of the LCD 15B, and the touch screen display 15 can realize display by the LCD 153 and the detection of a touch position which is touched by a pen or a finger. The user can select various objects, which are displayed on the LCD 156, by using a pen or a fingertip. The objects, which are to be touched by the user, include, for instance, a window for displaying various information, a software keyboard (virtual keyboard), a software touch pad (virtual pointing device), icons representing folders and files, menus, buttons, and an application window. The coordinate data representing the touch position on the display screen is input from the touch panel 15A to the CPU in the computer 10.

The LCD 15D on the second unit 12 is a display which is independent from the LCD 13B of the first unit 11. The LCDs 13B and 15B can be used as a multi-display for realizing a virtual screen environment. In this case, the virtual screen, which is managed by the operating system (OS) of the computer 10, includes a first screen region, which is displayed on the LCD 13B, and a second screen region, which is displayed on the LCD 15B. The first screen region and the second screen region can display arbitrary application windows, arbitrary objects, etc., respectively. In addition, the OS can manage the first screen region and second screen region as a logically single screen region, and can display an object at an arbitrary position in this screen region.

In the personal computer 10 of the embodiment, an input operation application for inputting data by a touch operation on the touch screen display 13, 15 by means of a pen or fingertip is provided in place of an input device such as a keyboard or a mouse/touch pad. The input operation application in the embodiment includes, for example, an input control program 200 for controlling the software keyboard and software touch pad.

Figure 2:
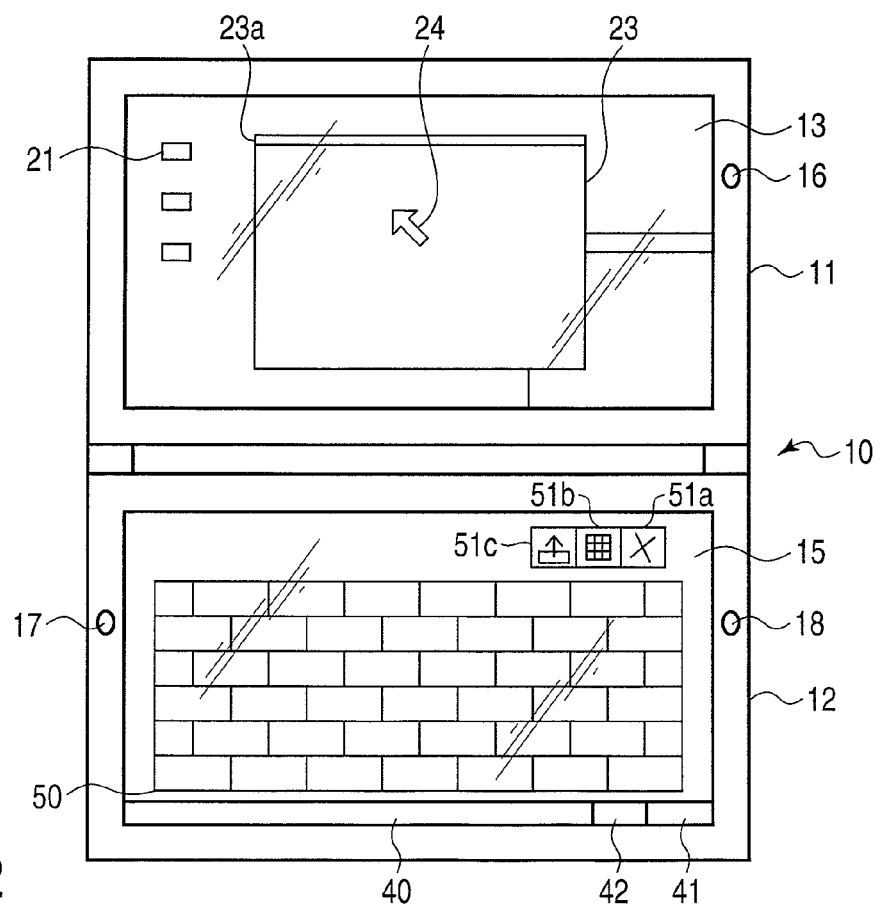
FIG. 2 is an exemplary view showing an example of a display screen of a personal computer in the embodiment.

FIG. 2 shows an example of the display screen of the personal computer 10 in the embodiment.

Icons 21, a window 23 and a cursor pointer 24 are displayed on the touch screen display 13. A title bar 23a is provided on an upper side of the window 23. A folder name and a file name are displayed on the title her 23a. In addition, the title bar 23a is provided with buttons for instructing a change of the display mode of the window 23 (e.g. Minimize button, Maximize button and close button), a full-screen display button for displaying the window 23 on the entire surface of the touch screen display 13, 15, and a display position change button for changing the display on which the window 23 is displayed. The display position of the cursor pointer 24 is controlled by a touch operation on the touch screen display 13, 15, or a touch operation on a region of a software touch pad which is set on the touch screen display 13, 15.

The touch screen display 15 displays a software keyboard 50. Aside from the full-screen display mode of the software keyboard 50, as shown in FIG. 2, a plurality of display modes are prepared for the software keyboard 50.

The software keyboard 50 is provided with a close button 51a, a mode change button 51b and a display position change button 51c. The close button 51a is operated in order to end the display of the software keyboard 50. The mode change button 51b is operated in order to change the software keyboard 50 to another mode which is prepared in advance. Each time the mode change button 51b is touched, the software keyboard 50 is changed to another mode. The display position change button 51c is operated in order to change the touch screen display on which the software keyboard 50 is to be displayed. For example, as shown in 2, when the software keyboard 50 is displayed on the touch screen display 15, the display position change button 51c displays an upward arrow pointing toward the touch screen display 13. If the display position change button 51c is touched in this state, the input control program 200 changes the display position of the software keyboard 50 from the touch screen display 15 to the touch screen display 13. When the software keyboard 50 is displayed on the touch screen display 13, the arrow of the display position change button 51c is a downward arrow.

In additions a toolbar 40 is provided at a lowermost row of the display area of the touch screen display 15. The toolbar 40 is provided with a keyboard start button 41 for starting the software keyboard, and a touch pad start button 42 for starting the software touch pad. By performing a touch operation on the keyboard start button 41 or touch pad start button 42, the user can start the input control program 200, in the same manner as in the case of inputting a start instruction by the button switch 17

In the meantime, the various objects shown in FIG. 2, such as the icons 21, window 23, cursor pointer 24 and software keyboard 50, can arbitrarily be displayed on either the touch screen display 13 or the touch screen display 15.

Figure 3:
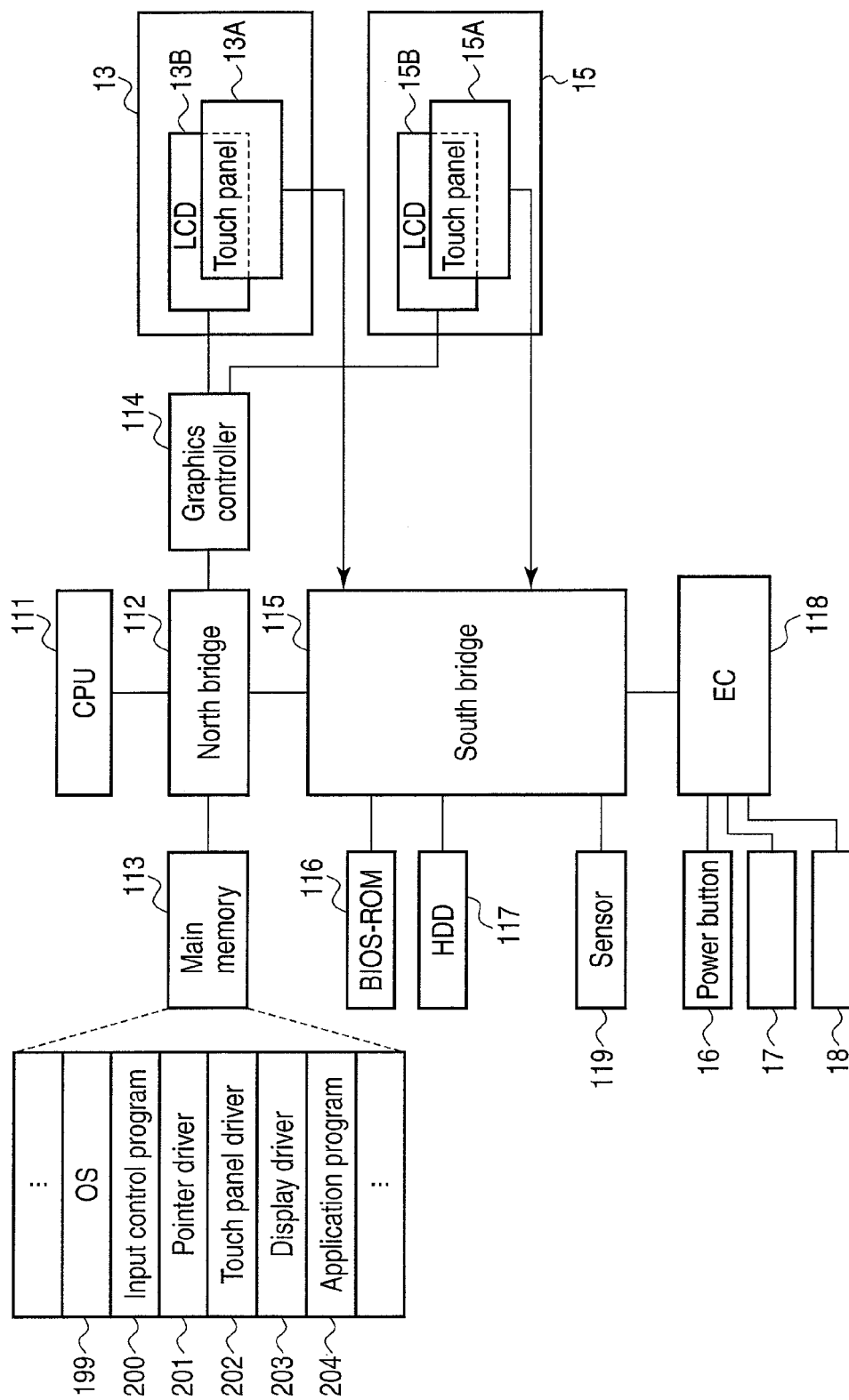
FIG. 3 is an exemplary block diagram showing a system configuration of the personal computer in the embodiment.

Next, the system configuration of the personal computer 10 in the embodiment is described. FIG. 3 is a block diagram showing the system configuration of the personal computer 10.

The personal computer 10 includes a CPU 111, a north bridge 112, a main memory 113, a graphics controller 114, a south bridge 115, a BIOS-ROM 116, a hard disk drive (HDD) 117, an embedded controller 118, and a sensor 119.

The CPU 111 is a processor which is provided in order to control the operation of the computer 10. The CPO 111 executes an operating system (OS) 199 and various application programs, which are loaded from the HDD 117 into the main memory 113. The application programs include an input operation application for controlling the software keyboard 50 and the software touch pad, and application programs 204 such as a browser program and a word processing program.

The CPU 111 also executes a system BIOS (Basic Input/Output System) which is stored in the BIOS-ROM 116. The system BIOS is a program for hardware control.

Besides, under the control of the OS 199, the CPU 111 executes a pointer driver 201 which controls the display of the cursor pointer 24 in accordance with a touch operation on the touch screen display 13, 15, a touch panel driver 202 which controls the driving of the touch panels 13A and 15A, and a display driver 203 which controls the display on the LCDs 13B and 15B.

The north bridge 112 is a bridge device which connects a local bus of the CPU 111 and the south bridge 115. The north bridge 112 includes a memory controller which access-controls the main memory 113. The graphics controller 114 is a display controller which controls the two LCDs 13B and 15B which are used as a display monitor of the computer 10.

The graphics controller 114 executes a display process (graphics arithmetic process) for rendering display data on a video memory (VRAM), based on a rendering request which is received from CPU 111 via the north bridge 112. A recording area for storing display data corresponding to a screen image which is displayed on the LCD 13B and a recording area for storing display data corresponding to a screen image which is displayed on the LCD 15B are allocated to the video memory. The transparent touch panel 13A is disposed on the display surface of the LCD 13B. Similarly, the transparent touch panel 15A is disposed on the display surface of the LCD 15B.

Each of the touch panels 13A and 15A is configured to detect a touch position on a touch detection surface by using, for example, a resistive method or a capacitive method. As the touch panel 13A, 15A, use may be made of a multi-touch panel which can detect two or more touch positions at the same time. The touch panel 13A, 15A outputs data, which is detected by the user's touch operation, to the south bridge 115.

The south bridge 115 incorporates an IDE (Integrated Drive Electronics) controller and a Serial ATA controller for controlling the HDD 121. The embedded controller (EC) 118 has a function of powering on/off the computer 10 in accordance with the operation of the power button switch 16 by the user. In addition, the south bridge 115 receives data from the touch panel 13A, 15A, and records the data in the main memory 113 via the north bridge 112

The sensor 119 is configured to detect the attitude of the personal computer 10. The sensor 119 detects whether the personal computer 10 is used in the direction in which the touch screen displays 13 and 15 are arranged in the up-and-down direction or in the direction in which the touch screen displays 13 and 15 are arranged in the right-and-left direction, and notifies the CPU 111 of the detection result via the south bridge 115.

Figure 4:
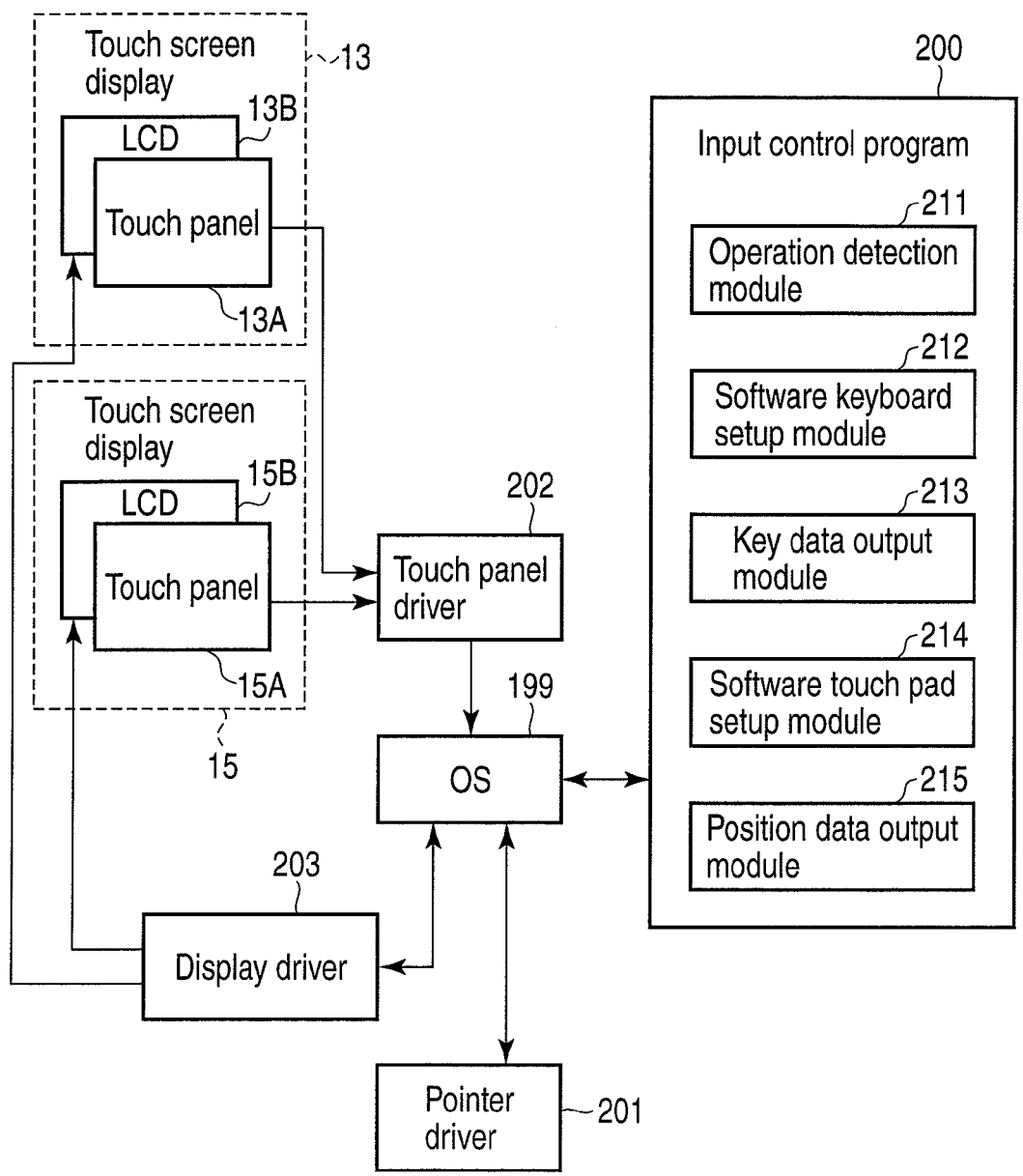
FIG. 4 is an exemplary block diagram showing the functional structure of an input control program in the embodiment.

Next, referring to FIG. 4, the functional structure of the input control program 200 in the embodiments (first embodiment, second embodiment and third embodiment) is described.

The input control program 200 receives touch position information, which is indicative of a touch position on the touch panel 13A, 15A, via the touch panel driver 202 and the OS 199. Based on the touch position information, the input control program 200 controls data input using the software keyboard and software touch pad.

The input control program 200 includes, as function executing modules, an operation detection module 211, a software keyboard setup module 212, a key data output module 213, a software touch pad setup module 214 and a position data output module 215.

The operation detection module 211 detects a touch operation by the user, based on the touch position information of the touch panel 13A, 153, which is input via the OS 199. The operation detection module 211 can detect whether the touch operation is a tap operation (first operation) in which a time period between a touch and a release of the touch is shorter than a preset time, or a slide operation (second operation) in which the time period between the touch and the release of the touch is the preset time or more.

The software keyboard setup module 212 sets a software keyboard (first region) including a plurality virtual keys (input regions) on the touch screen display 13, 15.

The key data output module 213 outputs key data corresponding to a virtual key including a tapped (touched) position, when a tap operation is detected within the region of the software keyboard which is set by the software keyboard setup module 212.

The software touch pad setup module 214 sets a software touch pad (second region) on the touch screen display 13, 15. In the case where the software keyboard 50 is set by the software keyboard setup module 212, the software touch pad setup module 214 can set the software touch pad in the region common to the software keyboard 50. In addition, the software touch pad setup module 214 can set a dedicated button region (third region) which functions like the right and left buttons of a mouse, in a region different from the software touch pad. The dedicated button region includes two regions corresponding to the right and left buttons of the mouse.

The position data output module 215 outputs data corresponding to an operation which is detected within the region of the software touch pad that is set by the software touch pad setup module 214.

(First Embodiment)

Referring to a flow chart of FIG. 5, the operation of a first embodiment is described.

FIG. 6 is an exemplary view showing examples of display screens of the touch screen displays 13 and 15 in the first embodiment.

To begin with, it is assumed that the start of the software keyboard and software touch pad has been instructed by the user's operation on the button switch 17, or by an operation on the keyboard start button 41 and touch pad start button 42.

Responding to the instruction from the user, the software keyboard setup module 212 of the input control program 200 sets the software keyboard 50, for example, on the touch screen display 15. In the example shown in FIG. 6, the software keyboard 50 is displayed on the entire surface of the touch screen display 15.

In addition, the software touch pad setup module 214 sets a software touch pad 60 in the region common to the software keyboard 50. In addition, the software touch pad setup module 214 sets a dedicated button region 62 in a region which is not common to the software keyboard 50.

The software keyboard setup module 212 displays characters corresponding to the virtual keys in the regions of the respective virtual keys of the software keyboard 50. The software touch pad setup module 214 effects display indicating the range of the region of the software touch pad 60, so that the user may visually recognize the characters which are displayed on the virtual keys of the software keyboard 50. For example, the software touch pad 60 may be displayed semi-transparently, or only the outside frame of the software touch pad 60 may be displayed.

In the state in which the software keyboard 50 and software touch pad 60 are set as shown in FIG. 6, if a touch operation is performed on the touch screen display 15 by the user, the operation detection module 211 detects that an input operation has been performed, based on the touch position information which is input via the OS 199 (block A1).

The operation detection module 211 determines whether the position of the user's touch operation, which is indicated by the touch position information, is in the software keyboard 50, software touch pad 60 (common region) or dedicated button region 62.

If the position of the user's touch operation is in none of the regions (No in block A2), the input control program 200 does not execute an input process corresponding to the touch position information. For example, when a touch operation has been performed on the touch screen display 13, the OS 199 causes, for example, the pointer driver 201 to execute, e.g. a process of moving the cursor pointer 24 in accordance with the touch position (absolute coordinates). When a touch operation has been performed on a position where the icon 21 is displayed, the OS 199 executes, for example, a process of setting the touched icon 21 in a selected state.

On the other hand, when the position of the touch operation is in any one of the software keyboard 50, software touch pad 60 (common region) and dedicated button region 62 (Yes in block A2), the operation detection module 211 determines whether the input operation is a tap operation or a slide operation. For example, if the time period between the first touch and the release of the touch is shorter than a preset time, the operation detection module 211 determines that the tap operation has been performed ("Tap operation" in block A3).

If the position of the tap operation is not in the dedicated button region 62 (No in block A4), that is, if the tap operation is performed on any one of the virtual keys of the software keyboard 50, the software keyboard setup module 212 outputs code data corresponding to the virtual key including the position of the tap operation to the OS 199 (block A6).

If the position of the tap operation is in the dedicated button region 62 (Yes in block A4), the software touch pad setup module 214 outputs to the OS 199 the data according to which of the two regions of the dedicated button region 62 has been tapped.

For example, when the time period between the first touch and the release of the touch is the preset time or more, the operation detection module 211 determines that the slide operation has been performed ("Slide operation" in block A3).

In this case, the position data output module 215 outputs to the OS 199 the position data (relative coordinates) in the region of the software touch pad 60, which corresponds to the touch position information. Based on the position data that is output from the input control program 200, the OS 199 moves the cursor pointer 24, for example, by the pointer driver 201.

Specifically, in the first embodiment, the software keyboard 50 and software touch pad 60 are set in the common region. When a tap operation is performed in the common region, code data corresponding to the virtual key at the tap position is output. When a slide operation is performed in the common region, position data indicative of the position of the slide operation is output. Thereby, without performing an operation of switching the software keyboard 50 and software touch pad 60, the input data can be changed, based on the difference of the input operation (tap operation or slide operation). In addition, since the dedicated button region 62 is provided in a region different from the software keyboard 50, the dedicated button region 62 can function as a touch pad and can execute a click input by a tap operation.

In the above description, the software touch pad 60 is set in the region common to the software keyboard 50 which is set on the entire surface of the touch screen display 15. Alternatively, the software keyboard 50 and the software touch pad 60 may be set in different regions.

For example, as shown in FIG. 7, a software keyboard 50a and a software touch pad 60a may be set independently in different regions. In this case, code data is output by a touch operation on the software keyboard 50a, and position data is output by a touch operation on the software touch pad 60a.

Figure 8:
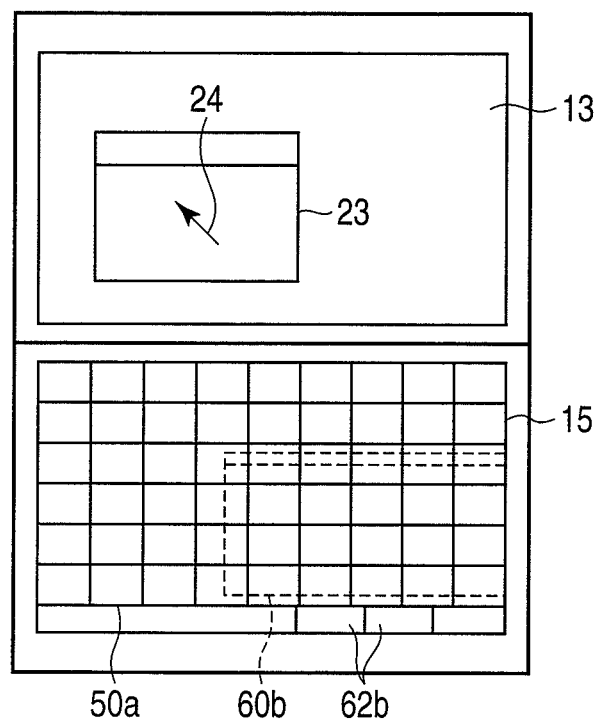
FIG. 8 is an exemplary view showing examples of the display screens of the touch screen displays in the first embodiment.

For example, by changing the mode of the software keyboard 50a, as shown in FIG. 8, the region in which the software touch pad 60a is set is overlapped with the software keyboard 50a. In this case, the software touch pad setup module 214 sets a dedicated button region 62b in a region different from the software keyboard 50a.

Thereby, in the same manner as described above, the tap operation and the slide operation are selectively used in the common region between the software keyboard 50a and software touch pad 60b, and thus the output of code data and the output of position data can be switched.

(Second Embodiment)

Figure 9:
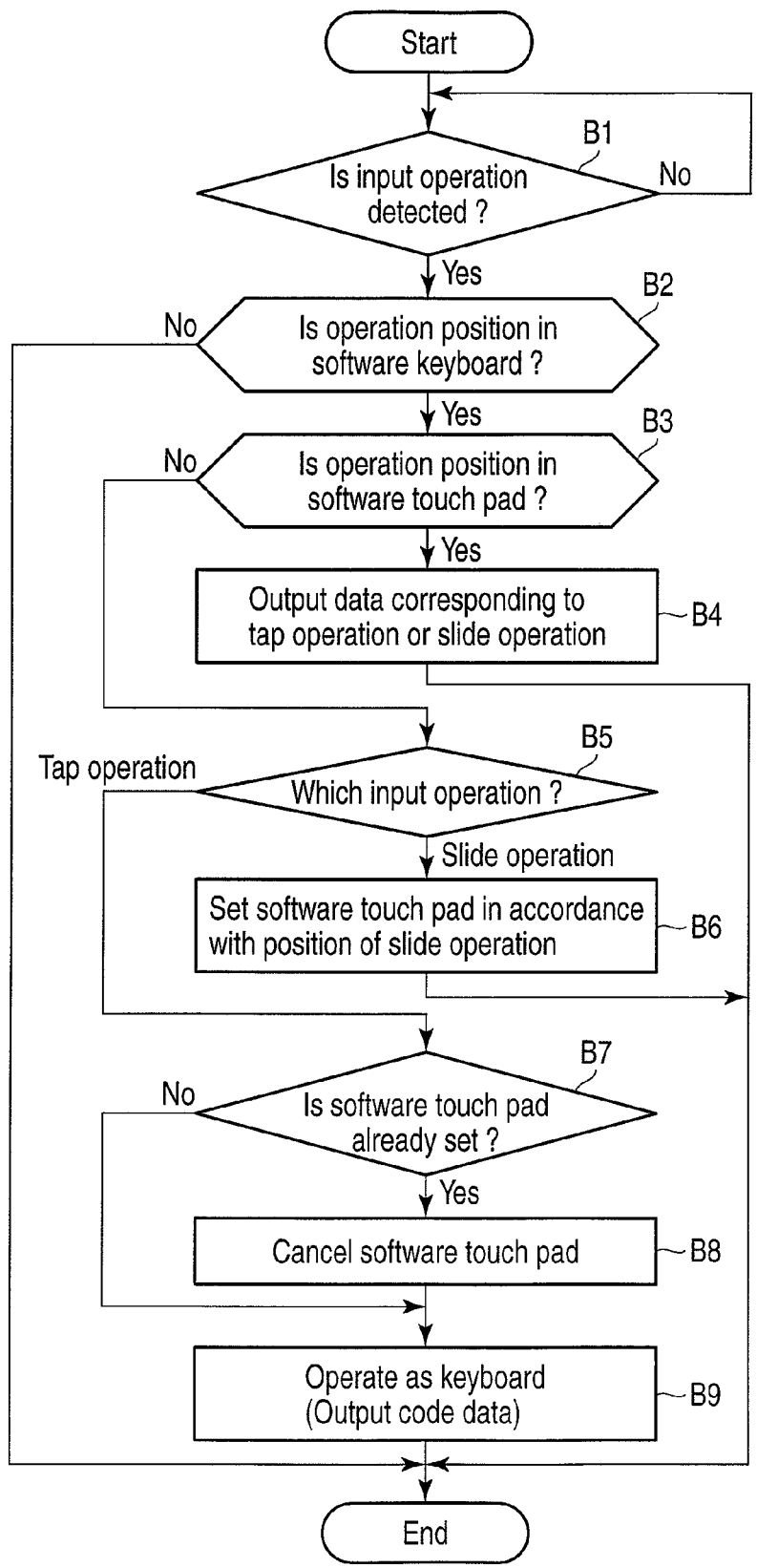
FIG. 9 is an exemplary flow chart illustrating the operation of a second embodiment.

Referring to a flow chart of FIG. 9, the operation of a second embodiment is described.

FIG. 10 and FIG. 11 are exemplary views showing examples of display screens of the touch screen displays 13 and 15 in the second embodiment.

To begin with, it is assumed that the start of the software keyboard has been instructed by the user's operation on the button switch 17, or by an operation on the keyboard start button 41.

Responding to the instruction from the user, the software keyboard setup module 212 of the input control program 200 sets the software keyboard 50, for example, on the touch screen display 15. In the example shown in FIG. 10, the software keyboard 50 is displayed on the entire surface of the touch screen display 15.

In the state in which the software keyboard 50 is set as shown in FIG. 10, if a touch operation is performed on the touch screen display 15 by the user, the operation detection module 211 detects that an input operation has been performed, based on the touch position information which is input via the OS 199 (block B1).

The operation detection module 211 determines whether the position of the user's touch operation, which is indicated by the touch position information, is in the region of the software keyboard 50.

If the position of the user's touch operation is not in the region of the software keyboard 50 (No in block 32), the input control program 200 does not execute an input process corresponding to the touch position information. In this case, like the first embodiment, the OS 199 executes, for example, a process of moving the cursor pointer 24 in accordance with the touch position (absolute coordinates).

On the other hand, when the position of the touch operation is in the region of the software keyboard 50 (Yes in block B2), the operation detection module 211 determines whether the position of the touch operation is in the software touch pad. If the software touch pad is not set (No in block B3), the operation detection module 211 determines whether the input operation is a tap operation or a slide operation. For example, if the time period between the first touch and the release of the touch is shorter than a preset time, the operation detection module 211 determines that the tap operation has been performed ("Tap operation" in block B5).

If the software touch pad is not set (No in block B7), that is, if a tap operation is performed on any one of the virtual keys of the software keyboard 50, the software keyboard setup module 212 outputs code data corresponding to the virtual key including the position of the tap operation to the OS 199 (block B9).

On the other hand, if the operation in the region of the software keyboard 50 is a slide operation ("Slide operation" in block B5), the software touch pad setup module 214 sets a software touch pad in accordance with the position of the slide operation (block B6). For example, when a slide operation has been performed at a point SP shown in FIG. 10, a rectangular software touch pad 63 with a predetermined size, which centers at the point SP, is set as shown in FIG. 11.

Although the operation for setting the software touch pad has been described as being the slide operation, it is not always necessary to move the position of the first touch. Specifically, if the touch is kept for a preset time or more, the execution of the slide operation is determined and the software touch pad 63 is set.

If an input operation is performed in the region of the software touch pad 63 after the software touch pad 63 is set (Yes in block B1), the position data output module 215 outputs data corresponding to a tap operation or a slide operation to the OS 199 (block B4). Although the software touch pad 63 is set in the region common to the software keyboard 50, the software touch pad 63 functions as a dedicated input region.

When a slide operation has been performed, in the same manner as described above, on the software keyboard 50 in a region other than the region where the software touch pad 63 is set ("Slide operation" in block B5), the software touch pad 63 is set at the position of the slide operation, as described above. In other words, the software touch pad 63 can be set at an arbitrary position within the region of the software keyboard 50.

On the other hand, when a tap operation has been performed on the software keyboard 50 in a region other than the region where the software touch pad 63 is set ("Tap operation" in block 65), the software touch pad setup module 214 cancels the already set software touch pad 63 (block 67, B8). In addition, the key data output module 213 outputs to the OS 199 the code data corresponding to the virtual key including the position of the tap operation (block B9).

Specifically, by performing a tap operation on the software keyboard 50 in the state in which the software touch pad 63 is set, the software touch pad 63 is canceled and an input to the software keyboard 50 is enabled.

In this manner, the software touch pad 63 can easily be set by the slide operation on the software keyboard 50, and the input to the software touch pad 63 is enabled. In addition, by tapping the software keyboard 50 in a region other than the region of the software touch pad 63, the software touch pad 63 can be canceled and a transition can easily be made to the data input using the software keyboard 50.

In the above description, the rectangular software touch pad 63 with the predetermined size is set at the touch position by the slide operation on the software keyboard 50 (e.g. the touch at the same position for a preset time or more). Alternatively, it is possible to set a software touch pad 63 having a shape corresponding to position data which is input by a slide operation.

For example, in FIG. 12, it is assumed that a touch operation is started at a point SPS, the position of the touch operation is moved by sliding to a point SPE, and then the touch is released. If the distance between the point SPS and point SPE is shorter than a preset distance, a software touch pad 63 having a rectangular shape centering at a midpoint SPM between the point SPS and point SPE is set. It is assumed that a horizontal size X1 and a vertical size Y1 of the software touch pad 63 are set such that a good tap operation and a good slide operation are enabled.

In addition, as shown in FIG. 13, when the distance between the point SPS and point SPE is the preset distance or more, a software touch pad 63 with a rectangular shape having the point. SPS and point. SPE as diagonal points is set. Accordingly, by performing a slide operation of an arbitrary distance within the region of the software keyboard 50, the user can set the software touch pad 63 having a size (horizontal size X2×vertical size Y2) corresponding to the distance of the slide operation.

(Third Embodiment)

Referring to a flow chart of FIG. 14, the operation of a third embodiment is described. The third embodiment is a combination of the first embodiment and second embodiment.

FIG. 15 is an exemplary view showing examples of display screens of the touch screen displays 13 and 15 in the third embodiment.

To begin with, it is assumed that the start of the software keyboard has been instructed by the user's operation on the button switch 17, or by an operation on the keyboard start button 41.

Responding to the instruction from the user, the software keyboard setup module 212 of the input control program 200 sets the software keyboard 50, for example, on the entire surface of the touch screen display 15.

In the state in which the software keyboard 50 is set, if a touch operation is performed on the touch screen display 15 by the user, the operation detection module 211 detects that an input operation has been performed, based on the touch position information which is input via the OS 199 (block C1).

The operation detection module 211 determines whether the position of the user's touch operation, which is indicated by the touch position information, is in the region of the software keyboard 50.

If the position of the user's touch operation is not in the region of the software keyboard 50 (No in block C2), the input control program 200 does not execute an input process corresponding to the touch position information. In this case, like the first embodiment, the OS 199 executes, for example, a process of moving the cursor pointer 24 in accordance with the touch position (absolute coordinates).

On the other hand, when the position of the touch operation is in the region of the software keyboard 50 (Yes in block C2), the operation detection module 211 determines whether the position of the touch operation is in the software touch pad. If the software touch pad is not set (No in block C3), the operation detection module 211 determines whether the input operation is a tap operation or a slide operation. For example, if the time period between the first touch and the release of the touch is shorter than a preset time, the operation detection module 211 determines that the tap operation has been performed ("Tap operation" in block C6).

If the software touch pad and dedicated button region are not set (No in block C8, C10), that is, if a tap operation is performed on any one of the virtual keys of the software keyboard 50, the software keyboard setup module 212 outputs code data corresponding to the virtual key including the position of the tap operation to the OS 199 (block C12).

On the other hand, if the operation in the region of the software keyboard 50 is a slide operation ("Slide operation" in block C6), the software touch pad setup module 214 sets a software touch pad and a dedicated button region in accordance with the position of the slide operation (block C7). For example, a rectangular software touch pad 64 with a predetermined size, which centers at the point SP where the slide operation has been performed, is set as shown in FIG. 15. In addition, a dedicated button region 65 comprising two regions is set near a lower part of the software touch pad 64.

If an input operation is performed in the region of the software touch pad 64 after the software touch pad 64 and dedicated button region 65 are set (Yes in block C1), the position data output module 215 outputs data corresponding to a slide operation to the OS 199 (block C5). Although the software touch pad 64 is set in the region common to the software keyboard 50, the software touch pad 64 functions as a dedicated input region.

If the input operation in the region of the software touch pad 64 is a tap operation (No in block C4), the software touch pad setup module 214 cancels the software touch pad 64 (block C11). In addition, the key data output module 213 outputs to the OS 199 the code data corresponding to the virtual key including the position of the tap operation (block C12).

If the tap operation is performed in the region of the dedicated button region 65 (Yes in block C8), the software touch pad setup module 214 outputs data corresponding to the tap operation to the OS 199 (block C9).

When a slide operation has been performed in the same manner as described above, on the software keyboard 50 in a region other than the region where the software touch pad 64 and dedicated button region 65 are set ("Slide operation" in block C6), the software touch pad 64 and dedicated button region 65 are set at the position where the slide operation has been performed, as described above. In other words, the software touch pad 64 and dedicated button region 65 can be set at an arbitrary position within the region of the software keyboard 50.

On the other hand, when a tap operation has been performed on the software keyboard 50 in a region other than the region where the software touch pad 64 and dedicated button region 65 are set (No in block C8), the software touch pad setup module 214 cancels the already set software touch pad 64 (block C10, C11). In addition, the key data output module 213 outputs to the OS 199 the code data corresponding to the virtual key including the position where the tap operation has been performed (block C12).

Specifically, by performing a tap operation on the software keyboard 50 in the state in which the software touch pad 64 and dedicated button region 65 are set, the software touch pad 64 and dedicated button region 65 are canceled and an input to the software keyboard 50 is enabled.

In this manner, the software touch pad 64 can easily be set by the slide operation on the software keyboard 50, and the input from the software touch pad 64 is enabled. In addition, since the dedicated button region 65 is set, the tap operation can be performed in the region common to the software keyboard 50. Furthermore, by tapping the software keyboard 50 in a region other than the region of the software touch pad 64 and dedicated button region 65, the software touch pad 64 and dedicated button region 65 can be canceled and a transition can easily be made to the data input using the software keyboard 50.

In the above description, the software keyboard and software touch pad are set on the touch screen display 15. However, the software keyboard and software touch pad may arbitrarily be set on either the touch screen display 13 or touch screen display 15

For example, as shown in FIG. 16, the personal computer 10 may be used in the mode in which the touch screen displays 13 and 15 are arranged in the right-and-left direction. The OS 199 detects the attitude of the personal computer 10 by the sensor 119, and changes the display direction of the LCDs 13B and 15B in accordance with the arrangement of the touch screen displays 13 and 15.

In this case, as shown in FIG. 16, by changing the display mode, the software keyboard 50 may be set on both the touch screen displays 13 and 15, in addition, by setting a software touch pad 60c in the region common to the software keyboard 50, the input operation may selectively be used in the same manner as described above, and switching can be effected between the data input from the software keyboard 50 and the data input from the software touch pad 60c. The movement of the cursor pointer 24 can be controlled by a slide operation on the software touch pad 60c. The cursor pointer 24 can be moved to a position on either the touch screen display 13 or touch screen display 15.

In each of the first to third embodiments, even if the touch screen display is small, the software keyboard and software touch pad are set on the common region, and thereby a sufficient operation region can be secured. Therefore, the operabilities of both the software keyboard and software touch pad are not degraded. Moreover, since both the software keyboard and software touch pad can be operated without moving the hands from the home position, an efficient data input is enabled even when data input is performed by frequently switching them. Besides, this contributes to reduction in size of the electronic apparatus.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiment described herein may be made without departing from the spirit of the inventions. The accompanying claims and their equivalents are intended to cover such forms or modifications as would fall within the scope and spirit of the inventions.

What is claimed is:

1. An electronic apparatus comprising:
    a touch screen display;
    a first region setup module configured to define on the touch screen display a first region comprising a plurality of input regions;
    an operation detection module configured to detect a touch operation on the first region and to determine whether the touch operation is a first operation in which a time period between a touch and a release of the touch is shorter than a first time period or a second operation in which the time period between the touch and the release of the touch is longer than or equal to the first time period;
    a first data output module configured to output first data corresponding to a first position of the first region where the touch operation is performed when the first operation is detected;
    a second region setup module configured to define a second region which overlaps with the first region in response to performance of the touch operation at a second position when the second operation is detected; and a second data output module configured to output second data corresponding to a second touch operation on the second region, wherein the second region setup module is further configured to set a size of the second region based on a distance between the first position and the second position.

2. The electronic apparatus of claim 1, wherein the second region setup module is further configured to cancel the second region in response to the first operation on the first region.

3. An input control method comprising:

defining a first region comprising a plurality of input regions on a touch screen display;

detecting whether a touch operation on the first region is a first operation in which a time period between a touch and a release of the touch is shorter than a first time period or a second operation in which the time period between the touch and the release of the touch is longer than or equal to the first time period;

outputting first data corresponding to a first position of the first region where the touch operation is performed when the first operation is detected;

defining a second region which overlaps with the first region in response to performance of the touch operation at a second position when the second operation is detected;

setting a size of the second region based on a distance between the first position and the second position; and outputting second data corresponding to a second touch operation on the second region.

\* \* \* \* \*